United States Patent [19]

Rosman

[11] Patent Number: 4,754,603
[45] Date of Patent: Jul. 5, 1988

[54] HYDRAULIC-DRIVE SYSTEM FOR AN INTERMITTENT-DEMAND LOAD

[76] Inventor: Alan H. Rosman, 21601 Erwin St., Woodland Hills, Calif. 91367

[21] Appl. No.: 75,780

[22] Filed: Jul. 20, 1987

[51] Int. Cl.$^4$ .............................................. F16D 31/02
[52] U.S. Cl. ........................................ 60/415; 60/413; 60/459; 60/460; 60/468; 60/488; 60/489; 60/493
[58] Field of Search .................. 60/468, 413, 414, 415, 60/417, 493, 487–489, 459, 460, 466, 484, 486

[56] References Cited

U.S. PATENT DOCUMENTS

| | | | |
|---|---|---|---|
| 3,680,313 | 8/1972 | Brundage | 60/460 |
| 3,913,453 | 10/1975 | Parquet | 60/493 X |
| 4,077,211 | 3/1978 | Fricke | 60/428 |
| 4,098,083 | 7/1978 | Carman | 60/484 |
| 4,215,545 | 8/1980 | Morello et al. | 60/414 X |

*Primary Examiner*—Edward K. Look
*Attorney, Agent, or Firm*—Hopgood, Calimafde, Kalil, Blaustein & Judlowe

[57] ABSTRACT

A prime-mover driven variable-rate pump of relatively great flow capacity is in delivery and return-circuit connection to an intermittently loaded hydraulic motor. A fixed-rate pump of substantially less capacity is continuously driven by the prime-mover, to charge a hydraulic accumulator, there being a safety relief to sump when a predetermined high-pressure threshold is reached. The accumulator is exclusively connected to the inlet of the variable-rate pump, being isolated by check valves from delivering any reverse flow to the fixed-rate pump and from delivering any reverse flow to the return portion of the motor-driving circuit. In said return portion, and between its check valve and the motor, a "dump" valve is operable for transient diversion of return flow to sump, thereby transiently enabling enhanced load-accelerating torque from the motor; this valve is preferably pressure-operated to "dump" position upon a load-reflecting pressure rise in the supply line from the variable-rate pump to the motor. Normal motor-running speeds are selectively determined by the variable-rate pump; and load-reflected angular momentum causes the motor to pump return fluid at elevated pressure, in partial recharge of the accumulator, thus assisting in braking the angular momentum while aiding in a recharge of the accumulator.

12 Claims, 1 Drawing Sheet

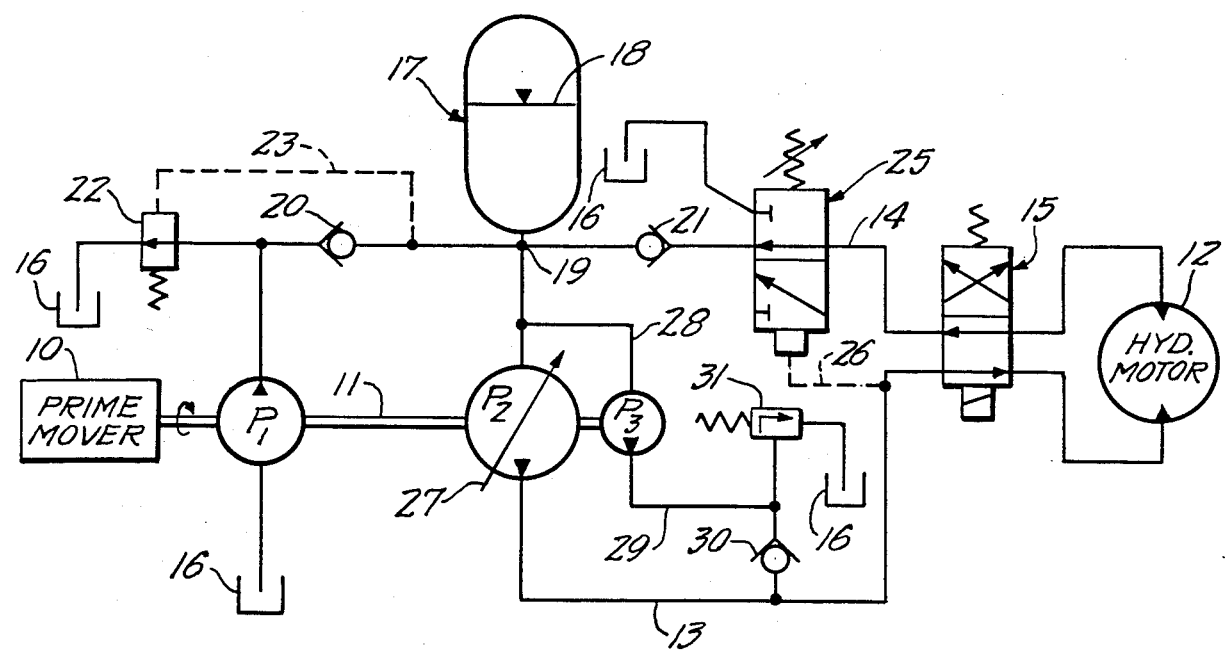

HYDRAULIC-DRIVE SYSTEM FOR AN INTERMITTENT-DEMAND LOAD

BACKGROUND OF THE INVENTION

The invention relates to use of a hydraulic accumulator as a means of storing energy to assist in meeting intermittent load-acceleration demands in a hydraulic drive of the load.

The text *Industrial Hydraulics*, Pippinger/Hicks, McGraw-Hill, Second Ed., at Section 6.8 ("Fluid Storage Accumulators"), pages 189/190, shows and describes a conventional use of a hydraulic accumulator as a volume-storage unit. Fluid from a fixed-delivery pump passes through a first check valve as long as work-load pressures are less than a relief-valve setting. When work-load pressures rise, e.g., to within 20 percent of the relief-valve setting, fluid can pass through a sequence valve to the accumulator, until the accumulator is fully charged, whereupon the relief valve will assure against further pressure rise. A variable-delivery pump is described as an alternative to the fixed delivery pump. In either case, the accumulator-stored volume and pressure are available to assist the pump output in response to a range of varying load demand.

Berkman, et al. U.S. Pat. No. 3,238,722 describes a more complex system of using a hydraulic accumulator for delivering stored pressure fluid for transient acceleration of a load, which happens to involve slewing angular acceleration of a crane about a vertical axis; the system also incorporates means for utilizing angular slewing momentum to restore hydraulic fluid to the accumulator during the deceleration phase of slewing. The system requires a high-pressure circuit with a first accumulator and a low-pressure circuit with a second accumulator, plus relatively elaborate control interconnections between components of these circuits.

BRIEF STATEMENT OF THE INVENTION

It is an object of the invention to provide improved and substantially more efficient means for using a hydraulic accumulator to meet intermittent and transient high-load demands on a hydraulic drive of the load.

Another object is to meet the above object with ability to serve both acceleration and deceleration (braking) phases of intermittently driving an inertial load.

The invention meets these objects by employing a prime-mover driven variable-rate pump of relatively great flow capacity, in delivery and return circuit connection to an intermittently loaded hydraulic motor. A fixed-rate pump of substantially less capacity is continuously driven by the prime-mover, to charge a hydraulic accumulator, there being a safety relief to sump when a predetermined high-pressure threshold is reached. The accumulator is exclusively connected to the inlet of the variable-rate pump, being isolated by check valves from delivering any reverse flow to the fixed-rate pump and from delivering any reverse flow to the return portion of the motor-driving circuit. In said return portion, and between its check valve and the motor, a "dump" valve is operable for transient diversion of return flow to sump, thereby transiently enabling enhanced load-accelerating torque from the motor; this valve is preferably pressure-operated to "dump" position upon a load-reflecting pressure rise in the supply line from the variable-rate pump to the motor. Normal motor-running speeds are selectively determined by the variable-rate pump; and load-reflected angular momentum causes the motor to pump return fluid at elevated pressure, in partial recharge of the accumulator, thus assisting in braking the angular momentum while aiding in a recharge of the accumulator.

DETAILED DESCRIPTION OF THE INVENTION

The invention will be described in detail for a preferred embodiment in conjunction with the accompanying single drawing.

In said drawing, a prime mover 10 which may be a continuously running internal-combustion engine is connected by shaft means 11 to drive a first pump $P_1$ of fixed-rate variety and intermediate flow capacity, a second pump $P_2$ of variable-rate variety and relatively great flow capacity, and a third pump $P_3$ of fixed-rate variety and relatively low flow capacity.

The variable-rate pump $P_2$ is connected to establish a normal driving circulation of hydraulic fluid through a hydraulic motor 12, namely, through a supply line 13 and a return line 14, subject to control of the driven direction of motor 12, based on whether a solenoid-operated reversing distributor valve 15 has or has not been actuated.

The fixed-rate pump $P_1$ draws hydraulic fluid from a sump 16 to charge a hydraulic accumulator 17, which will be understood to include a bladder 18 or other means of yieldably isolating hydraulic fluid beneath the bladder from presurizing gas, such as nitrogen, above the bladder. Delivered fluid from pump $P_1$ is shown reaching the accumulator 17 via a point 19 of connection to the return-line (14) portion of the motor-driving circuit of the variable-rate pump $P_2$. A first check valve 20 assures against reverse flow in the accumulator-charging line from pump $P_1$, and a second check valve 21 assures against reverse flow in the return line 14 to pump $P_2$. A relief valve 22 responds via a control connection 23 to relieve excess output of pump $P_1$ by discharge to sump whenever a limiting threshold of accumulator pressure is reached.

A two-position distributor valve 25 is the return line 14 is normally spring-urged to the position shown, wherein return-line fluid merely circulates back to the variable-rate pump $P_2$, via point 19. Valve 25 is a so-called "dump" valve, being shown pressure-operated, via a control connection 26 to the supply-line connection 13 for driving motor 12. Thus, when in response to a torsional load on motor 12, the pressure in line 13 builds to a predetermined level, this pressure is operative to shift valve 25 (as via a toggle mechanism, not shown) to its "dump" position, in which return flow in line 14 is discharged to sump. The pressure in the return line 14 then drops to zero, thereby placing maximum pressure drop across the motor 12, and enabling the accumulator-stored volume of high-pressure fluid to drive motor 12 at the rate which has been selected by control at 27 of the variable-rate pump $P_2$. Once the torsional load on motor subsides, e.g., after having accelerated a mass as at the commencement of slewing a crane from a given at-rest azimuth position, the motor-driving pressure in line 13 reduces; the threshold pressure for operation of valve 25 is again traversed, allowing valve 25 to return to its unactuated state wherein the hydraulic fluid is returned to the variable-rate pump $P_2$ for recirculation, while the charging pump $P_1$ restores fluid and rebuilds pressure in accumulator 17. In the illustrative case of a slewing crane, a destination azimuth position will be approached, at which point the operator will reduce the control setting 27 of the variable-rate pump $P_2$, thereby converting pump $P_2$ to a brake wherein recirculation is blocked or severely restricted. The momentum of the slewing load translates into rising load-driven pressure in the return line 14, in further aid of recharging accumulator 17, while a vacuum or near-vaccum condition occurs in the supply line 13.

Various measures may be adopted for avoiding equipment damage which might otherwise occur for sudden return of pump $P_2$ to its zero-flow setting. Such measures may include a relief-valve by-pass, throttling orifice and check valve connected in shunt from the inlet to the outlet of pump $P_2$; however, in the form shown, a vacuum-relieving shunt is provided by the low-capacity fixed-rate pump $P_3$, which is connected to provide a low-flow by-pass of variable-rate pump $P_2$ whenever the pressure in supply line 13 reduces to a predetermined relatively low level. Specifically, the inlet connection 28 to pump $P_3$ is in parallel to the inlet connection to the pump $P_2$, of much-greater capacity; the parallel connection is completed by the outlet line 29, including a check valve 30, to supply line 13. Maintenance of relatively low pressure in the low-flow output 29 of pump $P_3$ is assured by a relief valve 31 set to discharge to sump, for line-29 pressure exceeding the predetermined relatively low pressure.

Typical operating steps and qualitative magnitudes will serve for better understanding of the invention, say for the intermittent slewing drive of a crane which would conventionally require a continuously running 200 H.P. motor and associated clutching and braking means, for each slewing displacement from one to another azimuth position. To replace such a conventional system with the hydraulic system of the invention, the prime mover 10 may be of 25 H.P. capacity, governed for constant-speed drive of the pumps $P_1$, $P_2$, $P_3$, respectively to 20 gpm, 60 gpm, and 5 gpm capacity. The accumulator 17 may be a 50-gal. tank, initially charged with pressurizing gas to an illustrative level of 1000 psi. Upon start-up of the pump drives, hydraulic fluid drawn from sump will build liquid contents of the accumulator, to approximately three quarters the accumulator volume, at which point accumulator pressure will reach 3000 psi, which will have been set as the threshold for relief-valve discharge at 22. There is no drive of motor unless and until control 27 has been moved from its zero to a predetermined rate setting, which may be maximum or some intermediate setting, depending upon the speed with which it is desired to accomplish the slewing displacement. Upon setting control 27 to the desired flow rate, load inertia will be reflected at motor 12, so that pressure in line 13 will build to the threshold of actuation of valve 25, thereby dumping return flow in line 14 and establishing a maximum pressure differential across motor 12, for acceleration of the slewed load. Once accelerated, the slew-driving speed of motor 12 will level off, and pressure will materially reduce in line 13, with consequent automatic shift of valve 25 back to its normal unactuated position. To arrest the slewing motion, pump $P_2$ is controlled to its zero or near-zero flow condition, with attendant use of load momentum to restore hydraulic fluid to the accumulator; in this load-decelerating phase, the low pressure (e.g., 100 psi) at the outlet line 29 from pump $P_3$ will assure against damage through otherwise potentially severe transient vacuum development in the supply line 13.

A similar cycle exists for slewing back to the original azimuth position of the crane, the only difference being that solenoid valve 15 will first have been actuated, to assure a reversed direction of driving hydraulic motor 12.

The described invention will be seen to achieve stated objects with relative simplicity, ease of control and with great savings, in respect to the cost of installed-power capacity for particular situations involving intermittent drive of a load. For example, depending upon the nature of the intermittent loading, savings can reach 90 percent of what conventionally would be seen as the installed-power requirement at prime mover 10. The system of the invention permits selection within the full range of load-driven speeds, and the maximum charge of hydraulic fluid at 17 is available at maximum pressure to assure a load-accelerating boost in power output of motor 12, whatever the flow rate selected at 27. The reference to crane-slewing will be understood to be only by way of example, in that other uses can inter alia involve traveling and trolleying of bridge cranes, propulsion of industrial trucks and buses, and other automotive vehicles. No harm results from having exhausted the hydraulic-fluid capacity of any given load-accelerating phase, because load-acceleration will by then have occurred, so that pump $P_3$ alone can serve continued running motor 12, until deceleration (load-braking) is called for by operation of pump ($P_2$) control means 27; even so, pump $P_1$ continues steadily to restock the accumulator and to raise accumulator pressure in approach of the relief pressure set at 22.

While the invention has been described in detail for a preferred embodiment, it will be understood that modifications may be made without departing from the scope of the invention.

What is claimed is:

1. An energy-efficient hydraulic drive system for interposition between a prime-mover source of rotary power and a hydraulic motor for an intermittently driven load, said system comprising:

first and second pumps connected to the rotary-power output of the prime-mover source;

a hydraulic accumulator and a sump;

said first pump being of fixed-rate variety and connected to draw hydraulic fluid from said sump and to deliver the same to said accumulator via a first check valve oriented to prevent reverse flow, with relief-valve discharge to sump upon achievement of a predetermined high pressure of accumulated charge;

said second pump being of variable-rate variety and having substantially greater flow capacity than said first pump;

a fluid-delivery line from said accumulator to said motor via said second pump;

a fluid-return line from said motor to said accumulator via a second check valve oriented to prevent reversal of fluid-return flow; and a dumping valve interposed between said motor and said second check valve for transient diversion of return flow to sump, whereby to transiently enable enhanced load-accelerating torque from said motor;

further whereby motor-running speed may be selectively determined by said second pump, and, upon reducing the flow-rate setting of said second pump, reflected load momentum causes said motor to pump return fluid in partial recharge of said accumulator.

2. The drive system of claim 1, and including a limited-flow by-pass line with inlet and outlet connections to said fluid-delivery line and bridging said second pump.

3. The drive system of claim 2, in which said limited-flow by-pass line includes a third prime-mover driven pump of substantially reduced flow capacity compared to either of said first and second pumps.

4. The drive system of claim 3, in which said by-pass line includes check-valve means oriented to prevent reverse flow from said delivery line to said third pump.

5. The drive system of claim 4, and including a second relief valve connected to maintain a predetermined relatively low-pressure limit in the output of said third pump.

6. The drive system of claim 5, in which said predetermined pressure of accumulator charge is at least ten times the relief pressure of said second relief valve.

7. The drive system of claim 6, in which the predetermined pressure of accumulator charge is in the range of 20 to 50 times the relief pressure of said second relief valve.

8. An energy-efficient drive system for interposition between a prime-mover source of rotary power and a hydraulic motor for an intermittently driven load, said system comprising:
first, second and third pumps connected to the rotary-power output of the prime-mover source;
a hydraulic accumulator and a sump;
said first and third pumps being of variable-rate variety and of greatest capacity, said third pump being of lowest capacity, and said first pump being of capacity intermediate the respective capacities of said second and third pumps;
said first pump being connected to draw hydraulic fluid from said sump and to deliver the same to said accumulator via a first check valve oriented to prevent reverse flow, with relief-valve discharge to sump upon achievement of a predetermined high pressure of accumulator charge;
a fluid-delivery line from said accumulator to said motor via said second and third pumps in separate parallel branches, the branch for said third pump including a check valve oriented to prevent reverse flow and a second relief valve with discharge to sump;
a fluid-return line from said motor to said accumulator via an on-off distributor valve and a second check valve, said second check valve being interposed between said on-off valve and said accumulator and oriented to prevent reverse flow; and
means for selectively operating said on-off valve from a position of fluid return from said motor to said accumulator, to a position in which said fluid return is transiently diverted to sump.

9. The drive system of claim 1 or claim 8, and including a reversing distributor valve for selectively reversing the fluid-delivery-line and fluid-return-line connections to said motor.

10. The drive system of claim 1 or claim 8, in which the flow capacity of said second pump is in the order of three times that of said first pump.

11. The drive system of claim 1 or claim 8, in which the flow capacity of said third pump is no greater than one-tenth the flow capacity of said second pump.

12. The drive system of claim 1 or claim 8, in which the flow capacity of said second pump is at least twice that of said first pump.

* * * * *